(12) United States Patent
Schmisseur et al.

(10) Patent No.: US 11,176,091 B2
(45) Date of Patent: Nov. 16, 2021

(54) TECHNIQUES FOR DYNAMIC MULTI-STORAGE FORMAT DATABASE ACCESS

(71) Applicant: INTEL CORPORATION, Santa Clara, CA (US)

(72) Inventors: Mark A. Schmisseur, Phoenix, AZ (US); Thomas Willhalm, Sandhausen (DE); Francesc Guim Bernat, Barcelona (ES); Karthik Kumar, Chandler, AZ (US)

(73) Assignee: INTEL CORPORATION, Santa Clara, CA (US)

( * ) Notice: Subject to any disclaimer, the term of this patent is extended or adjusted under 35 U.S.C. 154(b) by 244 days.

(21) Appl. No.: 15/719,639

(22) Filed: Sep. 29, 2017

(65) Prior Publication Data

US 2019/0102403 A1    Apr. 4, 2019

(51) Int. Cl.
| | |
|---|---|
| *G06F 17/00* | (2019.01) |
| *G06F 16/13* | (2019.01) |
| *G06F 16/22* | (2019.01) |
| *G06F 16/178* | (2019.01) |
| *G06F 16/25* | (2019.01) |

(52) U.S. Cl.
CPC .......... *G06F 16/13* (2019.01); *G06F 16/1794* (2019.01); *G06F 16/221* (2019.01); *G06F 16/258* (2019.01)

(58) Field of Classification Search
CPC .... G06F 16/13; G06F 16/1794; G06F 16/221; G06F 16/258; G06F 17/30312; G06F 17/30569; G06F 12/1027
See application file for complete search history.

(56) References Cited

U.S. PATENT DOCUMENTS

| 5,341,485 A * | 8/1994 | Hattersley ........... G06F 12/1036 |
| | | 711/201 |
| 8,700,674 B2 * | 4/2014 | Bear ....................... G06F 16/22 |
| | | 707/802 |
| 10,078,453 B1 * | 9/2018 | Li ............................ G06F 3/064 |
| 2001/0047400 A1 * | 11/2001 | Coates .................... H04L 29/06 |
| | | 709/219 |
| 2006/0074965 A1 * | 4/2006 | Cunningham ........ G06F 16/221 |
| 2006/0206687 A1 * | 9/2006 | Vega ....................... G06F 12/10 |
| | | 711/206 |
| 2008/0189251 A1 * | 8/2008 | Branscome ......... G06F 16/2453 |

(Continued)

*Primary Examiner* — Greta L Robinson
(74) *Attorney, Agent, or Firm* — Kacvinsky Daisak Bluni PLLC

(57) ABSTRACT

Techniques and apparatus for providing access to data in a plurality of storage formats are described. In one embodiment, for example, an apparatus may include logic, at least a portion of comprised in hardware coupled to the at least one memory, to determine a first storage format of a database operation on a database having a second storage format, and perform a format conversion process responsive to the first storage format being different than the second storage format, the format conversion process to translate a virtual address of the database operation to a physical address, and determine a converted physical address comprising a memory address according to the first storage format. Other embodiments are described and claimed.

21 Claims, 7 Drawing Sheets

(56) References Cited

U.S. PATENT DOCUMENTS

| | | | |
|---|---|---|---|
| 2011/0276760 A1* | 11/2011 | Chou | G06F 9/3004 711/118 |
| 2012/0089811 A1* | 4/2012 | Sawai | G06F 12/1027 711/207 |
| 2013/0227236 A1* | 8/2013 | Flynn | G11C 16/26 711/165 |
| 2014/0214909 A1* | 7/2014 | Resch | G06F 16/1727 707/830 |
| 2015/0058293 A1* | 2/2015 | Kobayashi | G06F 3/0607 707/634 |
| 2015/0356158 A1* | 12/2015 | Potapov | G06F 16/24542 707/718 |
| 2015/0378616 A1* | 12/2015 | Khadiwala | G06F 3/0659 711/114 |
| 2016/0315874 A1* | 10/2016 | Medovich | G06F 12/1027 |
| 2019/0065400 A1* | 2/2019 | Shaji Lal | G06F 12/1054 |

* cited by examiner

TECHNIQUES FOR DYNAMIC MULTI-STORAGE FORMAT DATABASE ACCESS

TECHNICAL FIELD

Embodiments herein generally relate to information processing, and more particularly, to accessing data in multiple data storage formats.

BACKGROUND

Data providers, such as "big data" or in-memory applications within a data center or a cloud computing environment, store data in various formats to achieve certain storage and/or performance objectives. Each type of format typically provides certain advantages and disadvantages depending on the operational or storage perspective being considered. Common storage formats include row-oriented databases and column-oriented databases. Row-oriented databases store each row contiguously in memory and are preferred for operations that involve transactions to data sets, such as transactions. Column-oriented databases store each column contiguously in memory and are preferred for analytics and exhibit better data compression than row oriented databases. However, data consumers typically request data for multiple purposes such that benefits of using a certain format for a certain type of data request may be countered by the detriments of the format for other types of data requests or operations. Certain conventional databases attempt to address such issues by storing multiple copies of the data in multiple formats (for instance, a first copy in a row-oriented database, a second copy in a column-oriented database, and so on). However, the storage of multiple sets of data requires a substantial increase in storage and processing resources to handle twice (or more) the volume of data and, in addition, introduces material inefficiencies into data accesses and transactions.

DETAILED DESCRIPTION

Various embodiments may be generally directed to techniques for dynamically managing the format of accessed data. For example, a database may physically store data (for instance, in a database in a physical memory) in a first format. A data access logic may be configured according to some embodiments to provide access to the data in the database in a plurality of formats. In some embodiments, the data access logic may be operative to allow an application to load a table in an alternative format, such as in a column-oriented format for data stored in a database physically stored as a row-oriented database. In some embodiments, only one copy of the data is required to be stored physically in memory, however, the data access logic may manage the format for accesses of the data by software in a manner agnostic to the software. Accordingly, a software application may have access to multiple formats of data that is stored physically in a single format.

In this description, numerous specific details, such as component and system configurations, may be set forth in order to provide a more thorough understanding of the present invention. It will be appreciated, however, by one skilled in the art, that the invention may be practiced without such specific details. Additionally, some well-known structures, circuits, and other features have not been shown in detail, to avoid unnecessarily obscuring the present invention.

In the following description, references to "one embodiment," "an embodiment," "example embodiment," "various embodiments," etc., indicate that the embodiment(s) of the invention so described may include particular features, structures, or characteristics, but more than one embodiment may and not every embodiment necessarily does include the particular features, structures, or characteristics. Further, some embodiments may have some, all, or none of the features described for other embodiments.

Figure 1:
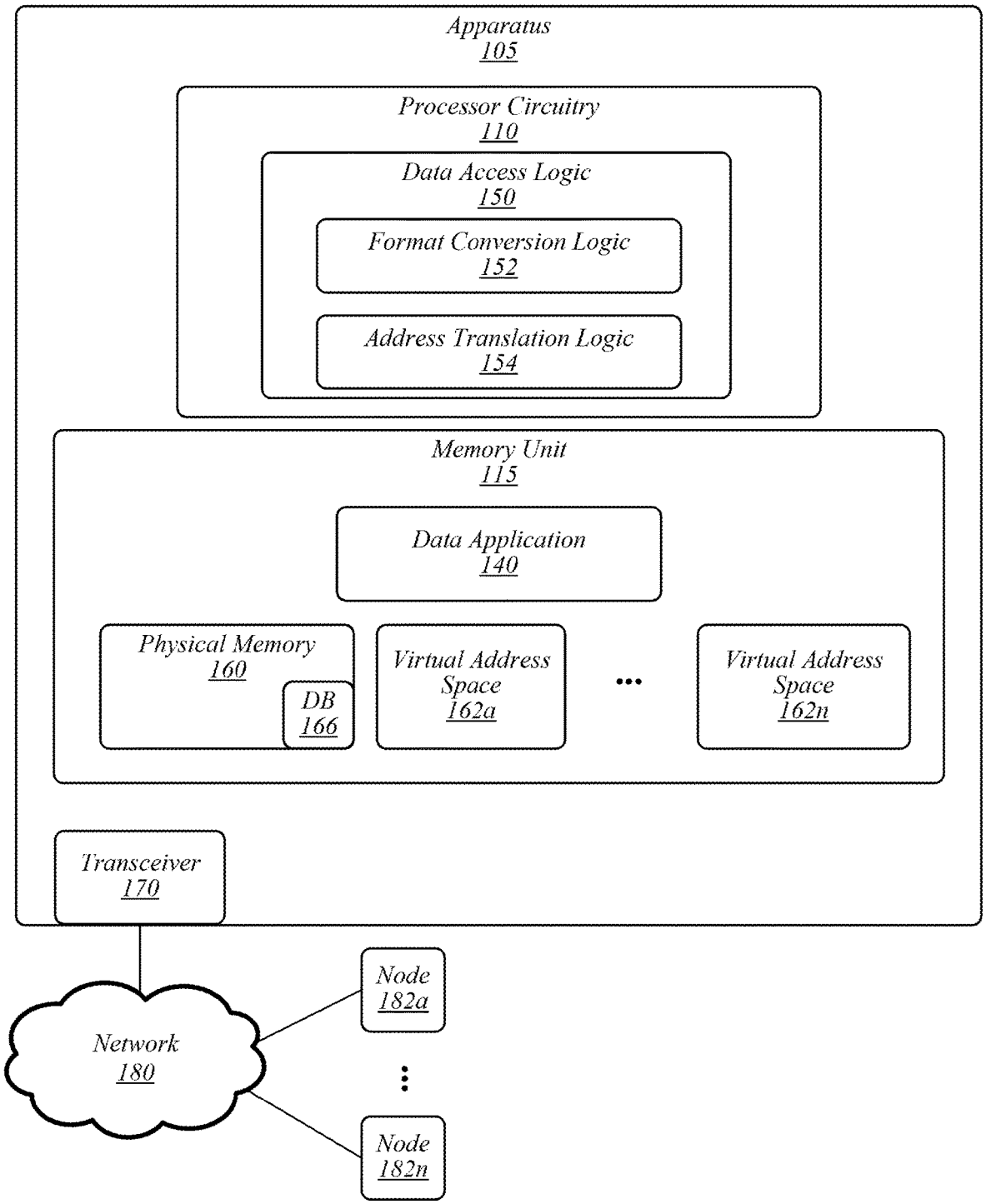
FIG. 1 illustrates an embodiment of a first operating environment.

As used in this description and the claims and unless otherwise specified, the use of the ordinal adjectives "first," "second," "third," etc. to describe an element merely indicate that a particular instance of an element or different instances of like elements are being referred to, and is not intended to imply that the elements so described must be in a particular sequence, either temporally, spatially, in ranking, or in any other manner FIG. 1 illustrates an example of an operating environment 100 that may be representative of various embodiments. The operating environment 100 depicted in FIG. 1 may include an apparatus 105 having a processor circuitry 110, a memory unit 115, and a transceiver 170. Processing circuitry 110 may include and or may access logic having instructions for performing operations according to some embodiments. Processing circuitry 110 may be communicatively coupled to memory unit 115 and/or transceiver 170.

Processing circuitry 110 may include and/or may access various logic for performing processes according to some embodiments. For instance, processing circuitry 110 may include and/or may access data access logic 150, format conversion logic 152, and/or address translation logic 154. Data access logic 150, format conversion logic 152, and/or address translation logic 154 may be implemented in hardware, software, or a combination thereof. As used in this application, the terms "logic, "component," "layer," "system," "circuitry," "decoder," "encoder," and/or "module" are intended to refer to a computer-related entity, either hardware, a combination of hardware and software, software, or software in execution, examples of which are provided by the exemplary computing architecture 700. For example, a logic, circuitry, or a layer may be and/or may include, but are not limited to, a process running on a processor, a processor, a hard disk drive, multiple storage drives (of optical and/or magnetic storage medium), an object, an executable, a thread of execution, a program, a computer, hardware circuitry, integrated circuits, application specific integrated circuits (ASIC), programmable logic devices (PLD), digital signal processors (DSP), field programmable gate array (FPGA), a system-on-a-chip (SoC), memory units, logic gates, registers, semiconductor device, chips, microchips, chip sets, software components, programs, applications, firmware, software modules, computer code, combinations of any of the foregoing, and/or the like.

Although data access logic 150 (and logic thereof) is depicted in FIG. 1 as being within processor circuitry 110, embodiments are not so limited. For example, data access logic 150 may be located within an accelerator, a processor core, an interface, an individual processor die, and/or the like. In some embodiments, a location of data access logic 150 or portions thereof may depend on a memory scheme of apparatus 105. For example, for local memory, data access logic 150 or portions thereof may be placed within a core of processing circuitry 110. In another example, for remote memory, data access logic 150 or portions thereof may be placed within the core of processing circuitry 110 and/or a remote and/or local interface (for instance, an Omni-Path (OP) interface (OPI), such as a host fabric interface (HFI)). In some embodiments, data access logic 150 or portions thereof may be placed within a memory controller.

Memory unit 115 may include various types of computer-readable storage media and/or systems in the form of one or more higher speed memory units, such as read-only memory (ROM), random-access memory (RAM), dynamic RAM (DRAM), Double-Data-Rate DRAM (DDRAM), synchronous DRAM (SDRAM), static RAM (SRAM), programmable ROM (PROM), erasable programmable ROM (EPROM), electrically erasable programmable ROM (EEPROM), flash memory, polymer memory such as ferroelectric polymer memory, ovonic memory, phase change or ferroelectric memory, silicon-oxide-nitride-oxide-silicon (SONOS) memory, magnetic or optical cards, an array of devices such as Redundant Array of Independent Disks (RAID) drives, solid state memory devices (e.g., USB memory, solid state drives (SSD) and any other type of storage media suitable for storing information. In addition, memory unit 115 may include various types of computer-readable storage media in the form of one or more lower speed memory units, including an internal (or external) hard disk drive (HDD), a magnetic floppy disk drive (FDD), and an optical disk drive to read from or write to a removable optical disk (e.g., a CD-ROM or DVD), a solid state drive (SSD), and/or the like.

In some embodiments, a database 166 or a portion thereof may be physically stored in memory unit 115. For example, database 166 may be stored in physical memory 160 in one or more storage formats. In some embodiments, database 166 may be stored in a single storage format. Non-limiting examples of storage formats may include row-oriented, column-oriented (or columnar), relational databases, correlation databases, object databases, hierarchical databases, and/or the like. In addition, database 166 may include databases or data sources from various proprietary and/or open source platforms, such as Oracle®, Microsoft® SQL Server, IBM® Informix®, SAP®, Sybase®, and/or the like. In some embodiments, database 166 may include a row-oriented database. In some embodiments, database 166 may include a column-oriented database. In some embodiments, database 166 may include a row-oriented database and a column-oriented database (for instance, storing two copies of the data of database 166, each physically stored in a different storage format). Although row-oriented and column-oriented databases are used as examples herein, embodiments are not so limited, as any type of storage format capable of operating according to some embodiments is contemplated herein. In various embodiments, database 166 or a portion thereof may be stored remotely from apparatus 205, such as in one of nodes 182a-n accessible via network 180.

In some embodiments, memory unit 115 may include a plurality of virtual address spaces 162a-n configured to store addresses of database 166 in a plurality of storage formats. For example, database 166 may include a row-oriented database. Virtual address space 162a may store at least a portion of the addresses of database 166 in a row-oriented storage format and virtual address space 162n may store at least a portion of the addresses of database 166 in a column-oriented storage format. Accordingly, in some embodiments, virtual address space may be used to provide the addresses of database 166 in a plurality of storage formats.

In various embodiments, memory unit 115 may store a data application 140 configured to access data of database 166 when executed by processor circuitry 110. For example, data application 140 may be an application interface for processing data requests, such as data queries or other data operations, for data consumers. Processor circuitry 110 may execute or otherwise access data access logic 150 for processing data operations on database 166, for example, responsive to data requests from data application 140. In general, data access logic 150 may be configured to access data in database 166, either directly or via virtual address spaces 162a-n, responsive to a data request and to return data corresponding to the data request. Data access logic 150 may be operative to determine the one or more data storage formats of database 166. In addition, data access logic 150 may be operative to determine the storage formats of virtual address spaces 162a-n. Data access logic 150 may be operative to receive, determine, or otherwise access a request type for a data request. In some embodiments, the request type may indicate the storage format of the requested data. In various embodiments, the request type may be specified directly, such as the data request including the storage format. In exemplary embodiments, the request type may be specified indirectly by data access logic 150 and/or data access logic based on one or more format criteria. Non-limiting examples of format criteria may include an operation type (for instance, column-orientated for analytics, row-oriented for transactions), data type, preceding data operations, data operation history, and/or the like.

In exemplary embodiments, data access logic 150 may determine whether the request type matches, correlates, or otherwise corresponds with the storage format of database 166. If the request type matches the storage format, data access logic 150 may perform a standard data access process using address translation logic 154. For example, address translation logic 154 may perform a standard translation from a virtual address space 162a-n to a physical address space of database 166 (for instance, a translation look buffer (TLB) translation or a page table translation). If the request type does not match the storage format of database 166, data access logic 150 may perform a format conversion process using format conversion logic 152. For example, database 166 may be a row-oriented database and the request type may be a column-oriented storage format, which is associated with virtual address space 162a. Format conversion logic 152 may perform a format conversion process to translate from virtual addresses of virtual address space 162a to physical address space of database 166 (for instance, from row-oriented to column-oriented). Non-limiting examples of format conversion processes may include stride (or offset) functions and advanced (or kernel) functions (see, for example, FIG. 4).

Figure 2:
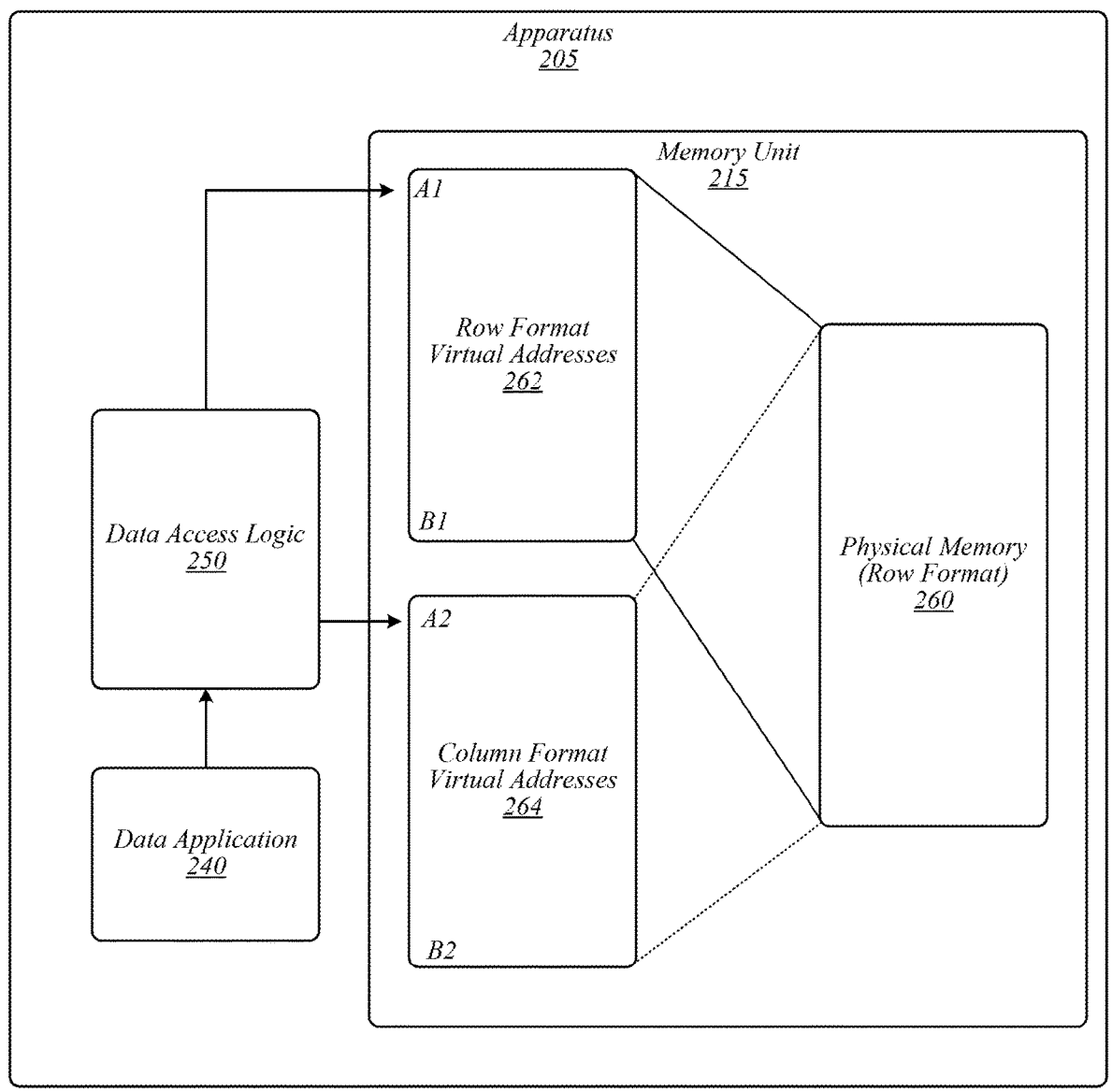
FIG. 2 illustrates an embodiment of a second operating environment.

FIG. 2 illustrates an example of an operating environment 200 that may be representative of various embodiments. The operating environment 200 depicted in FIG. 2 may include an apparatus 205 having a memory unit 215 that includes a physical memory 260 storing a database in a row format. Memory unit 215 may include row format virtual addresses 262 and column format virtual addresses 264. All of the addresses of the database may not be stored in virtual addresses 262 and 264 at a given time. For example, only a portion of the addresses of the database may be stored in virtual addresses 262 and 264, such as addresses associated with active and/or past data requests, addresses relevant to data associated with active and/or past data requests (for instance, as a form of cache for data typically requested together), and/or the like. Row format virtual addresses 262 may include addresses A1-B1 and column format virtual addresses 264 may include addresses A2-B2. Data application 240 may access data in the database via data access logic 250. For example, virtual addresses for data in a row format may be stored at address A1 of row format virtual addresses 262, and virtual addresses for the same data in a column format may be stored at address A2 of column format virtual addresses 264. Data application 240 may read from different virtual addresses A1 or A2 based on whether data application 240 requires row format data or column format data. In some embodiments, a data application 240 that uses multiple kinds of storage formats may experience a doubling of memory capacity.

Figure 3:
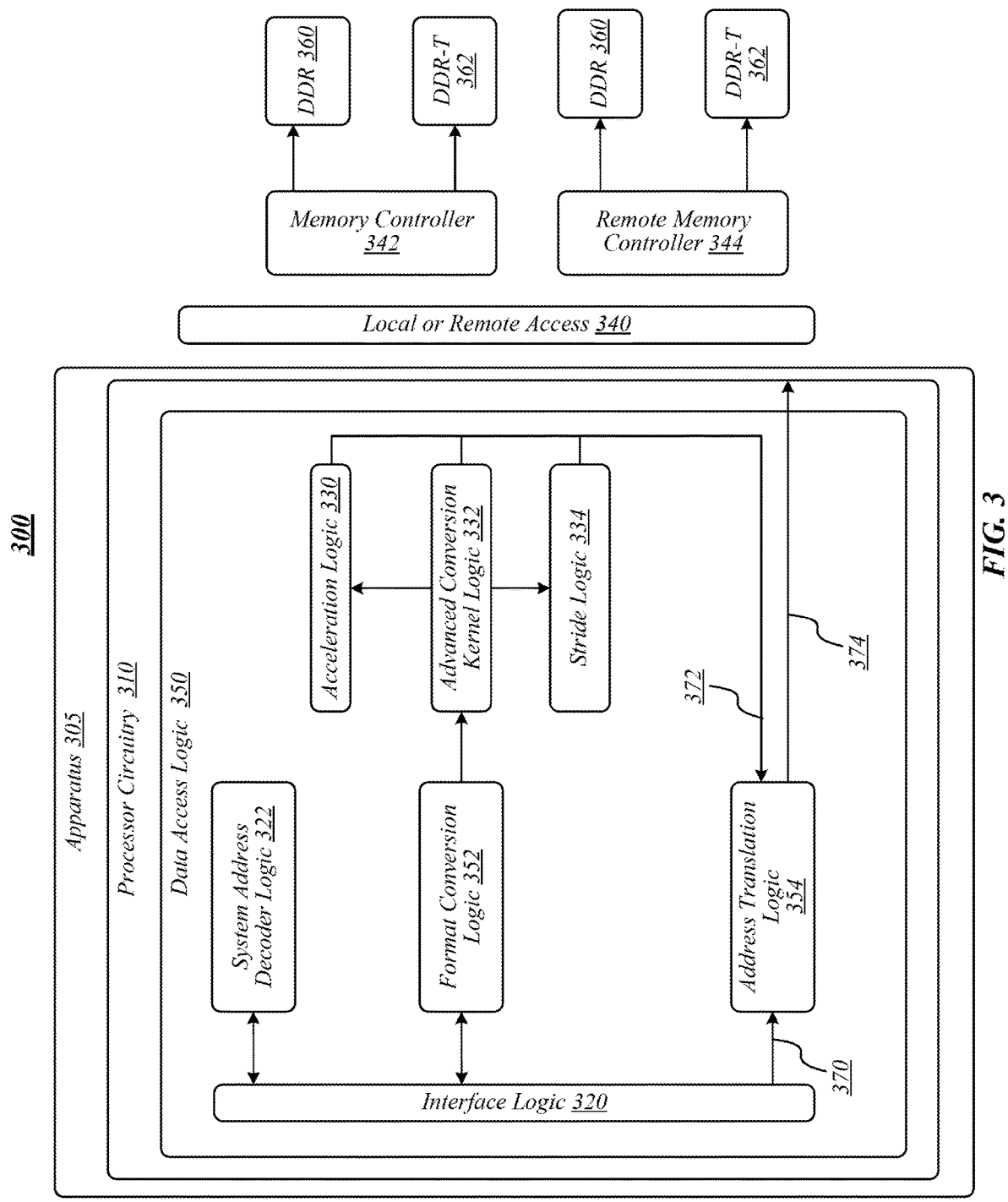
FIG. 3 illustrates an embodiment of a third operating environment.

FIG. 3 illustrates an example of an operating environment 300 that may be representative of various embodiments. The operating environment 300 depicted in FIG. 3 may include an apparatus 305 having processor circuitry 310. Although data access logic 350 is depicted as being arranged within processor circuitry 310, embodiments are not so limited as data access logic 350 or portions thereof may be arranged within an interface (for instance, a local or remote HFI), a memory controller, and/or the like.

Interface logic 320 may be configured to provide database read/write requests to various components of data access logic 350, such as a system address decoder logic 322, a format conversion logic 350, and/or an address translation logic 354. In various embodiments, system address decoder logic 322 or a portion thereof may be programmed by a software stack (for instance, the same or similar to a TLB). The software stack may provide memory allocation (malloc) interfaces that allow, among other things, the creation of a plurality of virtual address spaces where data may be stored according to different storage formats (such as a row format and a column format).

In various embodiments, system address decoder logic 322 may determine which type of address space a memory address of a database operation belongs to. In general, a database operation may include an operation on the database, such as a read, write, and/or the like. For example, if the memory address corresponds to a regular address space or a corresponds to a native database memory space (for instance, a virtual address space where the address is stored in columns and the corresponding physical storage is in columns), the translation from virtual address to physical address may follow a conventional process, such as a TLB translation. In another example, if the memory address is for a non-native database memory space (for instance, a virtual address space where the address is stored in columns and the corresponding physical storage is in rows), the translation from virtual address (VA) to physical address (PA) may follow a format conversion process according to some embodiments.

In some embodiments, a format conversion process may be performed by format conversion logic 352. In exemplary embodiments, format conversion logic 352 may or may cause the VA to be translated to the corresponding PA using a conventional translation process, for instance, via address translation logic 354. Conventional or "typical" reads or writes 370 may be provided to address translation logic 354. A conversion process may be used to convert PA to PA' (converted PA), where PA is how the address would be accessed in the mode associated with the virtual address space (for instance, row format) and the PA' corresponds to the actual real physical address space where the accessed address is stored in native mode (for instance, column format for a column-oriented database). The conversion process may use various processes, logic, circuitry, and/or the like. For example, acceleration logic 330, advanced conversion kernel logic 332, and/or stride logic 334 may be used to perform various aspects of the conversion process. In an embodiment in which format conversion logic 352 operates to convert row format to column format and vice versa, format conversion logic 352 may be referred to as col2row_row2col logic.

In various embodiments, stride logic 334 may be configured to perform a stride conversion process to generate PA'. For example, stride logic 334 may add a fixed, semi-fixed, or determined stride value (for instance, 3000) to PA to determine PA'. The stride value may be a preconfigured value or determined based on performing conversions (for instance, test conversions) between known PAs and PA's. The stride value may be or may include an offset or other conversion factor required to determine PA' from PA. In some embodiments, the stride factor may include a single value added to PA to determine PA'. In various embodiments, the stride factor may include a function (for instance, f(PA)=PA') or other sequence of operations used to determine PA'.

In various embodiments, advanced acceleration functions may be required to determine PA' from PA. Advanced conversion (kernel) logic 332, alone or in combination with acceleration logic 330, may include a set of acceleration functions that can be executed via an acceleration engine (for instance, FPGA, ASIC, and/or the like) that generate PA' given a PA through more complex operations. For example, in various embodiments, an advanced function or complex operation may include an address randomization process (for instance, randomization within an address range, for example, where the first format is a random physical address within the range), a "matrix transpose" operation, a hash operation, and/or the like. In some embodiments, the complex operations may be determined by mapping PAs to PA's to determine the types of operations, functions, calculations, and/or the like required to generate PA's from PAs. In various embodiments, PA' may be provided as a read or write PA address 372 from the logic performing the conversion process. Address translation logic 354 may provide the read or write final address 374 to the data consumer.

As shown in FIG. 3, apparatus 305 may include and/or use local or remote access 340. In some embodiments, apparatus 205 may include and/or use a local memory controller 342 supporting various buses, such as double data rate (DDR) 360 and/or transactional DDR (DDR-T) buses 362. In various embodiments, apparatus 205 may include and/or use a remote memory controller 344 supporting various buses, such as double data rate (DDR) 360 and/or transactional DDR (DDR-T) buses 362.

Figure 4:
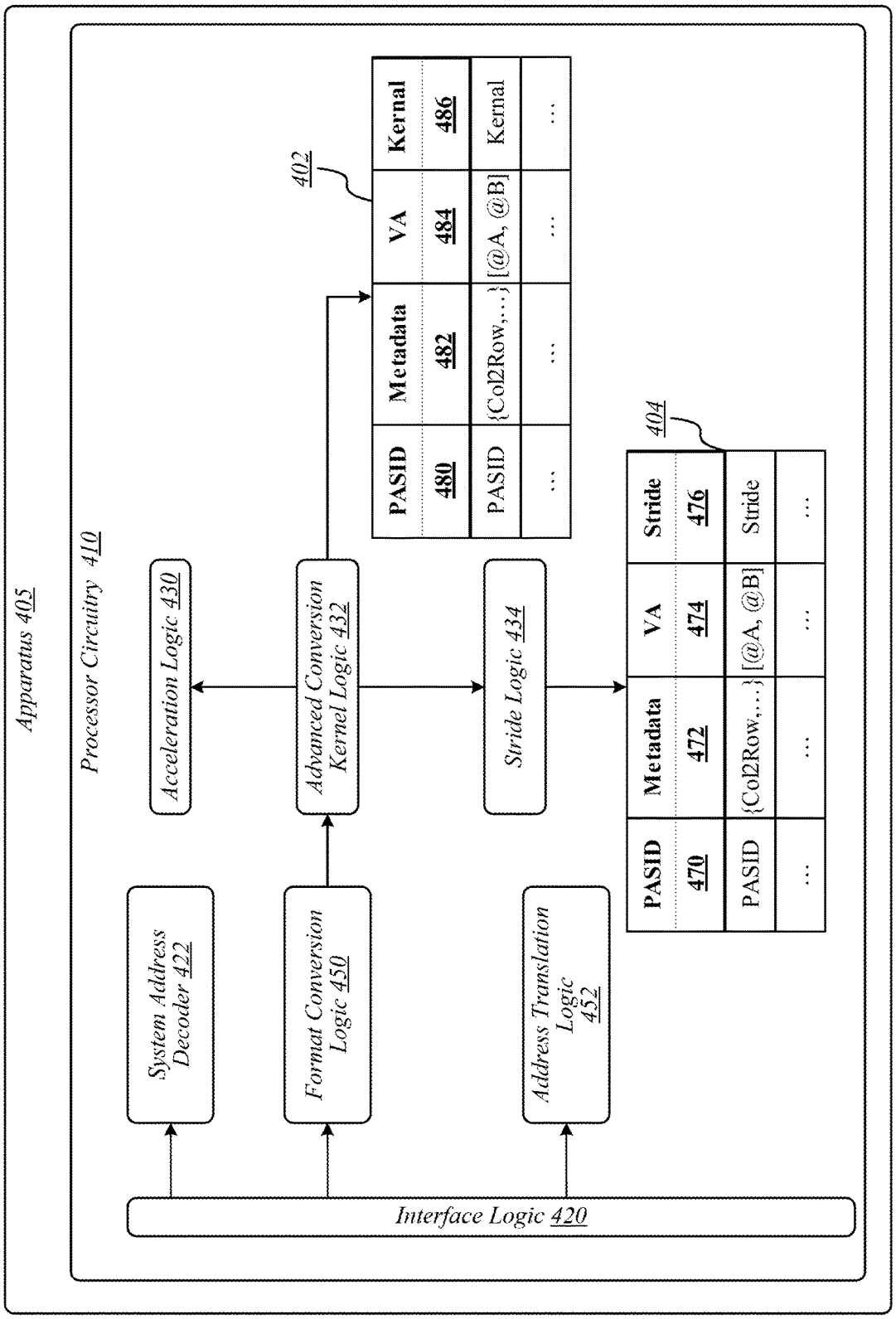
FIG. 4 illustrates an embodiment of a fourth operating environment

FIG. 4 illustrates an example of an operating environment 400 that may be representative of various embodiments. The operating environment 400 depicted in FIG. 4 may include an apparatus 405 having processor circuitry 410. Interface logic 420 may be configured to provide database read/write requests to various components of data access logic, such as a system address decoder logic 422, a format conversion logic 450, and/or an address translation logic 452.

System address decoder logic 422 may determine which type of address space a memory address of a database operation belongs to. In some embodiments, a format conversion process may be performed by format conversion logic 450. In exemplary embodiments, format conversion logic 450 may or may cause the VA to be translated to the corresponding PA using a conventional translation process, for instance, via address translation logic 454. A conversion process may be used to convert PA to PA'. The conversion process may use various processes, logic, circuitry, and/or the like. For example, stride logic 334 may be configured to perform a stride conversion process to generate PA'. As shown in FIG. 4, stride logic 434 may use and/or generate stride conversion information 404 that may include, without limitation, PA space identifier (PASID) 470, metadata 472, a virtual address 474, and a stride value 476. Advanced conversion kernel logic 432, alone or in combination with acceleration logic 430, may use or generate advanced conversion information 402 that may include, without limitation, PA space identifier (PASID) 480, metadata 482, a virtual address 484, and kernel information 486 (for instance, to perform advanced functions to determine PA').

In some embodiments, the database platform or portions thereof (for instance, a data application, data access logic 450, acceleration logic 430, stride logic 434, and/or the like) may be operative to determine or configure how a given VA range is mapped to PASID 470, 480 that is used for the conversion process. For example, the conversion process (for instance, stride or advanced) may be registered once the type of translation is selected.

Included herein are one or more logic flows representative of exemplary methodologies for performing novel aspects of the disclosed architecture. While, for purposes of simplicity of explanation, the one or more methodologies shown herein are shown and described as a series of acts, those skilled in the art will understand and appreciate that the methodologies are not limited by the order of acts. Some acts may, in accordance therewith, occur in a different order and/or concurrently with other acts from that shown and described herein. For example, those skilled in the art will understand and appreciate that a methodology could alternatively be represented as a series of interrelated states or events, such as in a state diagram. Moreover, not all acts illustrated in a methodology may be required for a novel implementation.

A logic flow may be implemented in software, firmware, hardware, or any combination thereof. In software and firmware embodiments, a logic flow may be implemented by computer executable instructions stored on a non-transitory computer readable medium or machine readable medium, such as an optical, magnetic or semiconductor storage. The embodiments are not limited in this context.

Figure 5:
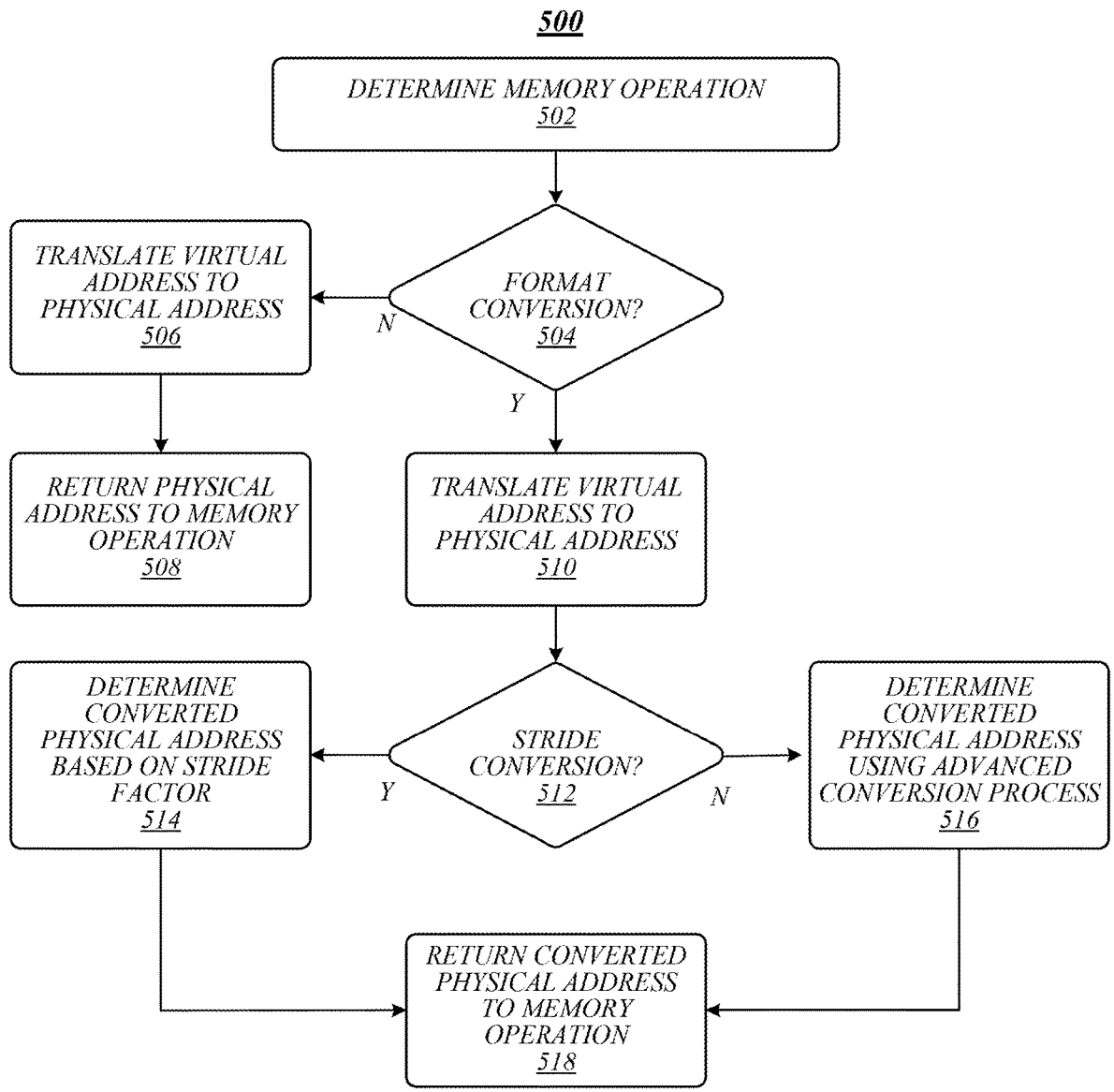
FIG. 5 illustrates an embodiment of a first logic flow.

FIG. 5 illustrates an embodiment of a logic flow 500. Logic flow 500 may be representative of some or all of the operations executed by one or more embodiments described herein, such as apparatus 105, 205, 305, and/or 405. In some embodiments, logic flow 500 may be representative of some or all of the operations of a conversion process.

Logic flow 500 may determine a database operation at 502. For example, data application 140 may generate a request to a particular memory address (for instance, a VA). The data request may be provided to data access logic 350 to determine a request type of database operation of a memory request, for instance, via system address decoder logic 322. The request type may specify or indicate a storage format of data requested in the data request. For example, for a database storing sales records, the database operation may include performing a transaction on the sales records that requires a row-oriented storage format. In another example, for a human resources database, the database operation may include finding the average hire date or returning the employee numbers within a certain department, which requires a column-oriented storage format.

At block 504, logic flow 500 may determine whether a format conversion is required. For example, in some embodiments, system address decoder logic 322 may identify which type of address space the memory address of the data request belongs to. If the address space (for instance, a row format address space) matches the database storage format (for instance, a row format), then a format conversion process is not required. If the address space (for instance, a column format address space) does not match the database storage format (for instance, a row format), then a format conversion process is required.

If logic flow 500 determines that a format conversion is not required at block 504, logic flow 500 may translate the virtual address to a physical address at block 506. For example, data access logic 350 or a portion thereof, such as system address decoder logic 322, may provide the VA to address translation logic 354 to determine the PA. Logic flow 500 may return the physical address to the database operation. For example, address translation logic 354 may provide the read or write final address 374 (for instance, PA) to the database operation, which may operate to provide the corresponding values to a data consumer (for instance, data application 140).

Figure 6:
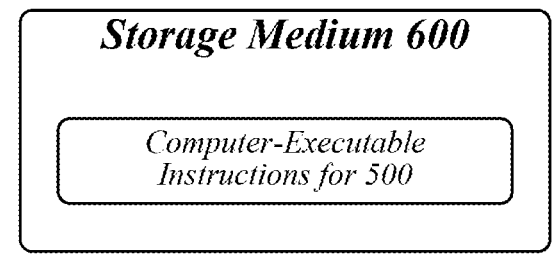
FIG. 6 illustrates an example of a storage medium.

If logic flow 500 determines that a format conversion is required at block 504, logic flow 500 may translate the virtual address to a physical address at block 506. For example, data access logic 350 or a portion thereof, such as system address decoder logic 322, may provide the VA to address translation logic 354 to determine the PA. Logic flow 500 may determine whether to perform a stride conversion at block 512. For example, the type of conversion process for the address space may be registered or the type of conversion process may be pre-configured. If logic flow 500 determines that a stride conversion is to be performed at block 512, logic flow 500 may determine a converted physical address based on the stride factor at block 514. For example, stride logic 334 may be configured to perform a stride conversion process to generate PA'. Stride logic 334 may add a fixed, semi-fixed, or determined stride value to PA to determine PA'. If logic flow 500 determines that a stride conversion is not to be performed at block 512, logic flow 500 may determine converted physical address using an advanced conversion process at block 516. For example, advanced acceleration functions may be required to determine PA' from PA. Advanced conversion kernel logic 332, alone or in combination with acceleration logic 330, may include a set of acceleration functions that can be executed via an acceleration engine (for instance, FPGA, ASIC, and/or the like) that generate PA' given a PA through more complex operations. At block 518, logic flow 500 may return the converted physical address to the database operation. For example, PA' may be provided as a read or write PA address 372 from the logic performing the conversion process. Address translation logic 354 may provide the read or write final address 374 to the data consumer FIG. 6 illustrates an example of a storage medium 600. Storage medium 600 may comprise an article of manufacture. In some examples, storage medium 600 may include any non-transitory computer readable medium or machine readable medium, such as an optical, magnetic or semiconductor storage. Storage medium 600 may store various types of computer executable instructions, such as instructions to implement logic flow 500. Examples of a computer readable or machine readable storage medium may include any tangible media capable of storing electronic data, including volatile memory or non-volatile memory, removable or non-removable memory, erasable or non-erasable memory, writeable or re-writeable memory, and so forth. Examples of computer executable instructions may include any suitable type of code, such as source code, compiled code, interpreted code, executable code, static code, dynamic code, object-oriented code, visual code, and the like. The examples are not limited in this context.

Figure 7:
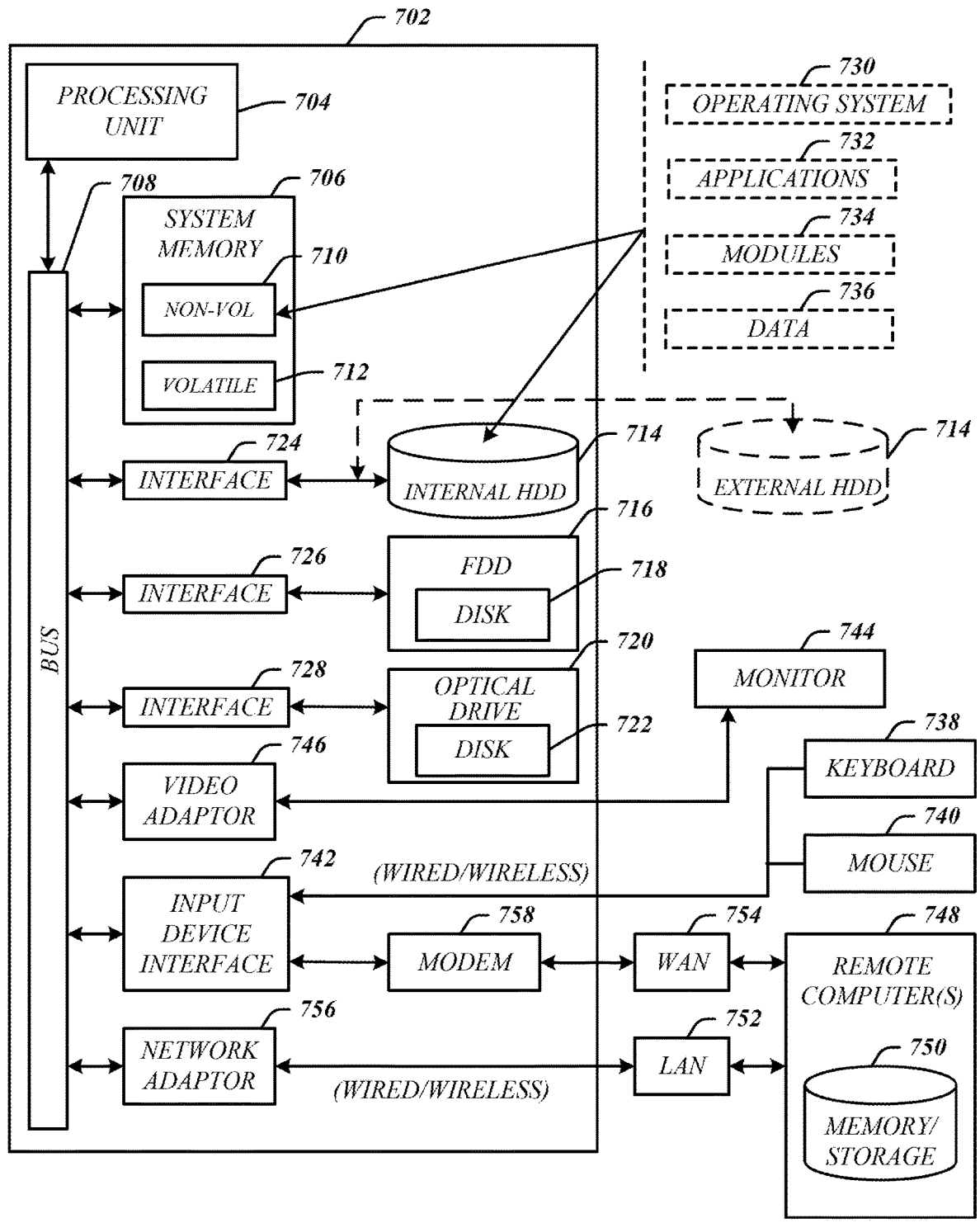
FIG. 7 illustrates an embodiment of a computing architecture.

FIG. 7 illustrates an embodiment of an exemplary computing architecture 700 suitable for implementing various embodiments as previously described. In various embodiments, the computing architecture 700 may comprise or be implemented as part of an electronic device. In some embodiments, the computing architecture 700 may be representative, for example, of apparatus 205, 305, and/or 405. The embodiments are not limited in this context.

As used in this application, the terms "system" and "component" and "module" are intended to refer to a computer-related entity, either hardware, a combination of hardware and software, software, or software in execution, examples of which are provided by the exemplary computing architecture 700. For example, a component can be, but is not limited to being, a process running on a processor, a processor, a hard disk drive, multiple storage drives (of optical and/or magnetic storage medium), an object, an executable, a thread of execution, a program, and/or a computer. By way of illustration, both an application running on a server and the server can be a component. One or more components can reside within a process and/or thread of execution, and a component can be localized on one computer and/or distributed between two or more computers. Further, components may be communicatively coupled to each other by various types of communications media to coordinate operations. The coordination may involve the uni-directional or bi-directional exchange of information. For instance, the components may communicate information in the form of signals communicated over the communications media. The information can be implemented as signals allocated to various signal lines. In such allocations, each message is a signal. Further embodiments, however, may alternatively employ data messages. Such data messages may be sent across various connections. Exemplary connections include parallel interfaces, serial interfaces, and bus interfaces.

The computing architecture 700 includes various common computing elements, such as one or more processors, multi-core processors, co-processors, memory units, chipsets, controllers, peripherals, interfaces, oscillators, timing devices, video cards, audio cards, multimedia input/output (I/O) components, power supplies, and so forth. The embodiments, however, are not limited to implementation by the computing architecture 700.

As shown in FIG. 7, the computing architecture 700 comprises a processing unit 704, a system memory 706 and a system bus 707. The processing unit 704 can be any of various commercially available processors, including without limitation an AMD® Athlon®, Duron® and Opteron® processors; ARM® application, embedded and secure processors; IBM® and Motorola® DragonBall® and PowerPC® processors; IBM and Sony® Cell processors; Intel® Celeron®, Core (2) Duo®, Itanium®, Pentium®, Xeon®, and XScale® processors; and similar processors. Dual microprocessors, multi-core processors, and other multiprocessor architectures may also be employed as the processing unit 704.

The system bus 707 provides an interface for system components including, but not limited to, the system memory 706 to the processing unit 704. The system bus 707 can be any of several types of bus structure that may further interconnect to a memory bus (with or without a memory controller), a peripheral bus, and a local bus using any of a variety of commercially available bus architectures. Interface adapters may connect to the system bus 707 via a slot architecture. Example slot architectures may include without limitation Accelerated Graphics Port (AGP), Card Bus, (Extended) Industry Standard Architecture ((E)ISA), Micro Channel Architecture (MCA), NuBus, Peripheral Component Interconnect (Extended) (PCI(X)), PCI Express, Personal Computer Memory Card International Association (PCMCIA), and the like.

The system memory 706 may include various types of computer-readable storage media in the form of one or more higher speed memory units, such as read-only memory (ROM), random-access memory (RAM), dynamic RAM (DRAM), Double-Data-Rate DRAM (DDRAM), synchronous DRAM (SDRAM), static RAM (SRAM), programmable ROM (PROM), erasable programmable ROM (EPROM), electrically erasable programmable ROM (EEPROM), flash memory, polymer memory such as ferroelectric polymer memory, ovonic memory, phase change or ferroelectric memory, silicon-oxide-nitride-oxide-silicon (SONOS) memory, magnetic or optical cards, an array of devices such as Redundant Array of Independent Disks (RAID) drives, solid state memory devices (e.g., USB memory, solid state drives (SSD) and any other type of storage media suitable for storing information. In the illustrated embodiment shown in FIG. 7, the system memory 706 can include non-volatile memory 710 and/or volatile memory 712. A basic input/output system (BIOS) can be stored in the non-volatile memory 710.

The computer 702 may include various types of computer-readable storage media in the form of one or more lower speed memory units, including an internal (or external) hard disk drive (HDD) 714, a magnetic floppy disk drive (FDD) 716 to read from or write to a removable magnetic disk 717, and an optical disk drive 720 to read from or write to a removable optical disk 722 (e.g., a CD-ROM or DVD). The HDD 714, FDD 716 and optical disk drive 720 can be connected to the system bus 707 by a HDD interface 724, an FDD interface 726 and an optical drive interface 727, respectively. The HDD interface 724 for external drive implementations can include at least one or both of Universal Serial Bus (USB) and IEEE 1374 interface technologies.

The drives and associated computer-readable media provide volatile and/or nonvolatile storage of data, data structures, computer-executable instructions, and so forth. For example, a number of program modules can be stored in the drives and memory units 710, 712, including an operating system 730, one or more application programs 732, other program modules 734, and program data 736. In one embodiment, the one or more application programs 732, other program modules 734, and program data 736 can include, for example, the various applications and/or components of apparatus 105, 205, 305, and/or 405.

A user can enter commands and information into the computer 702 through one or more wire/wireless input devices, for example, a keyboard 737 and a pointing device, such as a mouse 740. Other input devices may include microphones, infra-red (IR) remote controls, radio-frequency (RF) remote controls, game pads, stylus pens, card readers, dongles, finger print readers, gloves, graphics tablets, joysticks, keyboards, retina readers, touch screens (e.g., capacitive, resistive, etc.), trackballs, trackpads, sensors, styluses, and the like. These and other input devices are often connected to the processing unit 704 through an input device interface 742 that is coupled to the system bus 707, but can be connected by other interfaces such as a parallel port, IEEE 1394 serial port, a game port, a USB port, an IR interface, and so forth.

A monitor 744 or other type of display device is also connected to the system bus 707 via an interface, such as a video adaptor 746. The monitor 744 may be internal or external to the computer 802. In addition to the monitor 744, a computer typically includes other peripheral output devices, such as speakers, printers, and so forth.

The computer 702 may operate in a networked environment using logical connections via wire and/or wireless communications to one or more remote computers, such as a remote computer 747. The remote computer 747 can be a workstation, a server computer, a router, a personal computer, portable computer, microprocessor-based entertainment appliance, a peer device or other common network node, and typically includes many or all of the elements described relative to the computer 702, although, for purposes of brevity, only a memory/storage device 750 is illustrated. The logical connections depicted include wire/wireless connectivity to a local area network (LAN) 752 and/or larger networks, for example, a wide area network (WAN) 754. Such LAN and WAN networking environments are commonplace in offices and companies, and facilitate enterprise-wide computer networks, such as intranets, all of which may connect to a global communications network, for example, the Internet.

When used in a LAN networking environment, the computer 702 is connected to the LAN 752 through a wire and/or wireless communication network interface or adaptor 756. The adaptor 756 can facilitate wire and/or wireless communications to the LAN 752, which may also include a wireless access point disposed thereon for communicating with the wireless functionality of the adaptor 756.

When used in a WAN networking environment, the computer 702 can include a modem 757, or is connected to a communications server on the WAN 754, or has other means for establishing communications over the WAN 754, such as by way of the Internet. The modem 757, which can be internal or external and a wire and/or wireless device, connects to the system bus 707 via the input device interface 742. In a networked environment, program modules depicted relative to the computer 702, or portions thereof, can be stored in the remote memory/storage device 750. It will be appreciated that the network connections shown are exemplary and other means of establishing a communications link between the computers can be used.

The computer 702 is operable to communicate with wire and wireless devices or entities using the IEEE 802 family of standards, such as wireless devices operatively disposed in wireless communication (e.g., IEEE 802.16 over-the-air modulation techniques). This includes at least Wi-Fi (or Wireless Fidelity), WiMax, and Bluetooth™ wireless technologies, among others. Thus, the communication can be a predefined structure as with a conventional network or simply an ad hoc communication between at least two devices. Wi-Fi networks use radio technologies called IEEE 802.11x (a, b, g, n, etc.) to provide secure, reliable, fast wireless connectivity. A Wi-Fi network can be used to connect computers to each other, to the Internet, and to wire networks (which use IEEE 802.3-related media and functions).

One or more aspects of at least one embodiment may be implemented by representative instructions stored on a machine-readable medium which represents various logic within the processor, which when read by a machine causes the machine to fabricate logic to perform the techniques described herein. Such representations, known as "IP cores" may be stored on a tangible, machine readable medium and supplied to various customers or manufacturing facilities to load into the fabrication machines that actually make the logic or processor. Some embodiments may be implemented, for example, using a machine-readable medium or article which may store an instruction or a set of instructions that, if executed by a machine, may cause the machine to perform a method and/or operations in accordance with the embodiments. Such a machine may include, for example, any suitable processing platform, computing platform, computing device, processing device, computing system, processing system, computer, processor, or the like, and may be implemented using any suitable combination of hardware and/or software. The machine-readable medium or article may include, for example, any suitable type of memory unit, memory device, memory article, memory medium, storage device, storage article, storage medium and/or storage unit, for example, memory, removable or non-removable media, erasable or non-erasable media, writeable or re-writeable media, digital or analog media, hard disk, floppy disk, Compact Disk Read Only Memory (CD-ROM), Compact Disk Recordable (CD-R), Compact Disk Rewriteable (CD-RW), optical disk, magnetic media, magneto-optical media, removable memory cards or disks, various types of Digital Versatile Disk (DVD), a tape, a cassette, or the like. The instructions may include any suitable type of code, such as source code, compiled code, interpreted code, executable code, static code, dynamic code, encrypted code, and the like, implemented using any suitable high-level, low-level, object-oriented, visual, compiled and/or interpreted programming language.

The following are non-limiting example embodiments:

Example 1 is an apparatus, comprising logic, at least a portion of comprised in hardware coupled to the at least one memory, to determine a first storage format of a database operation on a database having a second storage format, and perform a format conversion process responsive to the first storage format being different than the second storage format, the format conversion process to translate a virtual address of the database operation to a physical address, and determine a converted physical address comprising a memory address according to the first storage format.

Example 2 is the apparatus according to Example 1, the first storage format comprising one of a column-oriented storage format or a row-oriented storage format.

Example 3 is the apparatus according to Example 1, the second storage format comprising one of a column-oriented storage format or a row-oriented storage format, the second storage format being different than the first storage format.

Example 4 is the apparatus according to Example 1, the logic to determine one of a plurality of virtual address spaces addressed by the virtual address.

Example 5 is the apparatus according to Example 1, the logic to determine one of a plurality of virtual address spaces addressed by the virtual address, each of the plurality of virtual address spaces for a different storage format Example 6 is the apparatus according to Example 1, the logic to determine the first storage format of the database operation based on a type of a virtual address space addressed by the virtual address.

Example 7 is the apparatus according to Example 1, the virtual address addressed to one of a plurality of virtual address spaces for a physical memory storing the database, the one of the plurality of virtual address spaces having the first storage format.

Example 8 is the apparatus according to Example 1, the logic to perform the format conversion process to translate the virtual address to a physical address using a translation look buffer (TLB) translation or a page table translation.

Example 9 is the apparatus according to Example 1, the logic to perform the format conversion process to determine the converted physical address using a stride logic.

Example 10 is the apparatus according to Example 1, the logic to perform the format conversion process to determine the converted physical address using an advanced conversion logic.

Example 11 is the apparatus according to Example 1, the logic to perform the format conversion process to determine the converted physical address using an advanced conversion logic comprising one of an address randomization process, a matrix transpose operation, or a has operation.

Example 12 is the apparatus according to Example 1, the logic to perform the format conversion process to determine the converted physical address via a stride conversion process operative to add a stride value to the physical address to determine the converted physical address.

Example 13 is the apparatus according to Example 1, the logic to perform the format conversion process to determine a conversion type for the format conversion process based on a virtual address range.

Example 14 is a system, comprising the apparatus according to any of claims 1-13, and at least one network interface.

Example 15 is a method, comprising determining a first storage format of a database operation on a database having a second storage format, and performing a format conversion process responsive to the first storage format being different than the second storage format, the format conversion process comprising translating a virtual address of the database operation to a physical address, and determining a converted physical address comprising a memory address according to the first storage format.

Example 16 is the method according to Example 15, the first storage format comprising one of a column-oriented storage format or a row-oriented storage format.

Example 17 is the method according to Example 15, the second storage format comprising one of a column-oriented storage format or a row-oriented storage format, the second storage format being different than the first storage format.

Example 18 is the method according to Example 15, comprising determining one of a plurality of virtual address spaces addressed by the virtual address.

Example 19 is the method according to Example 15, comprising determining one of a plurality of virtual address spaces addressed by the virtual address, each of the plurality of virtual address spaces for a different storage format.

Example 20 is the method according to Example 15, comprising determining the first storage format of the database operation based on a type of a virtual address space addressed by the virtual address.

Example 21 is the method according to Example 15, the virtual address addressed to one of a plurality of virtual address spaces for a physical memory storing the database, the one of the plurality of virtual address spaces having the first storage format.

Example 22 is the method according to Example 15, comprising performing the format conversion process to translate the virtual address to a physical address using a translation look buffer (TLB) translation or a page table translation.

Example 23 is the method according to Example 15, comprising performing the format conversion process to determine the converted physical address using a stride logic.

Example 24 is the method according to Example 15, comprising performing the format conversion process to determine the converted physical address using an advanced conversion logic.

Example 25 is the method according to Example 15, comprising performing the format conversion process to determine the converted physical address using an advanced conversion logic comprising one of an address randomization process, a matrix transpose operation, or a has operation.

Example 26 is the method according to Example 15, comprising performing the format conversion process to determine the converted physical address via a stride conversion process operative to add a stride value to the physical address to determine the converted physical address.

Example 27 is the method according to Example 15, comprising performing the format conversion process to determine a conversion type for the format conversion process based on a virtual address range.

Example 28 is a computer-readable storage medium, comprising a plurality of instructions that, when executed, enable processing circuitry to determine a first storage format of a database operation on a database having a second storage format, and perform a format conversion process responsive to the first storage format being different than the second storage format, the format conversion process to translate a virtual address of the database operation to a physical address, and determine a converted physical address comprising a memory address according to the first storage format.

Example 29 is the computer-readable storage medium according to Example 28, the first storage format comprising one of a column-oriented storage format or a row-oriented storage format.

Example 30 is the computer-readable storage medium according to Example 28, the second storage format comprising one of a column-oriented storage format or a row-oriented storage format, the second storage format being different than the first storage format.

Example 31 is the computer-readable storage medium according to Example 28, the plurality of instructions, when executed, to enable the processing circuitry to determine one of a plurality of virtual address spaces addressed by the virtual address.

Example 32 is the computer-readable storage medium according to Example 28, the plurality of instructions, when executed, to enable the processing circuitry to determine one of a plurality of virtual address spaces addressed by the virtual address, each of the plurality of virtual address spaces for a different storage format.

Example 33 is the computer-readable storage medium according to Example 28, the plurality of instructions, when executed, to enable the processing circuitry to determine the first storage format of the database operation based on a type of a virtual address space addressed by the virtual address.

Example 34 is the computer-readable storage medium according to Example 28, the virtual address addressed to one of a plurality of virtual address spaces for a physical memory storing the database, the one of the plurality of virtual address spaces having the first storage format.

Example 35 is the computer-readable storage medium according to Example 28, the plurality of instructions, when executed, to enable the processing circuitry to perform the format conversion process to translate the virtual address to a physical address using a translation look buffer (TLB) translation or a page table translation.

Example 36 is the computer-readable storage medium according to Example 28, the plurality of instructions, when executed, to enable the processing circuitry to perform the format conversion process to determine the converted physical address using a stride logic.

Example 37 is the computer-readable storage medium according to Example 28, the plurality of instructions, when executed, to enable the processing circuitry to perform the format conversion process to determine the converted physical address using an advanced conversion logic.

Example 38 is the computer-readable storage medium according to Example 28, the plurality of instructions, when executed, to enable the processing circuitry to perform the format conversion process to determine the converted physical address using an advanced conversion logic comprising one of an address randomization process, a matrix transpose operation, or a has operation.

Example 39 is the computer-readable storage medium according to Example 28, the plurality of instructions, when executed, to enable the processing circuitry to perform the format conversion process to determine the converted physical address via a stride conversion process operative to add a stride value to the physical address to determine the converted physical address.

Example 40 is the computer-readable storage medium according to Example 28, the plurality of instructions, when executed, to enable the processing circuitry to perform the format conversion process to determine a conversion type for the format conversion process based on a virtual address range.

Example 41 is an apparatus, comprising a storage format determination means to determine a first storage format of a database operation on a database having a second storage format, and a format conversion means to perform a format conversion process responsive to the first storage format being different than the second storage format, the format conversion process to translate a virtual address of the database operation to a physical address, and determine a converted physical address comprising a memory address according to the first storage format.

Example 42 is the apparatus according to Example 41, the first storage format comprising one of a column-oriented storage format or a row-oriented storage format.

Example 43 is the apparatus according to Example 41, second storage format comprising one of a column-oriented storage format or a row-oriented storage format, the second storage format being different than the first storage format.

Example 44 is the apparatus according to Example 41, the format conversion means to determine one of a plurality of virtual address spaces addressed by the virtual address.

Example 45 is the apparatus according to Example 41, the format conversion means to determine one of a plurality of virtual address spaces addressed by the virtual address, each of the plurality of virtual address spaces for a different storage format.

Example 46 is the apparatus according to Example 41, the format conversion means to determine the first storage format of the database operation based on a type of a virtual address space addressed by the virtual address.

Example 47 is the apparatus according to Example 41, the virtual address addressed to one of a plurality of virtual address spaces for a physical memory storing the database, the one of the plurality of virtual address spaces having the first storage format.

Example 48 is the apparatus according to Example 41, the format conversion means to perform the format conversion process to translate the virtual address to a physical address using a translation look buffer (TLB) translation or a page table translation.

Example 49 is the apparatus according to Example 41, the format conversion means to perform the format conversion process to determine the converted physical address using a stride logic.

Example 50 is the apparatus according to Example 41, the format conversion means to perform the format conversion process to determine the converted physical address using an advanced conversion logic.

Example 51 is the apparatus according to Example 41, the format conversion means to perform the format conversion process to determine the converted physical address using an advanced conversion logic comprising one of an address randomization process, a matrix transpose operation, or a has operation.

Example 52 is the apparatus according to Example 41, the format conversion means to perform the format conversion process to determine the converted physical address via a stride conversion process operative to add a stride value to the physical address to determine the converted physical address.

Example 53 is the apparatus according to Example 41, the format conversion means to perform the format conversion process to determine a conversion type for the format conversion process based on a virtual address range.

Example 54 is a system, comprising the apparatus according to any of Examples 41-53, and at least one network interface.

It should be noted that the methods described herein do not have to be executed in the order described, or in any particular order. Moreover, various activities described with respect to the methods identified herein can be executed in serial or parallel fashion.

Although specific embodiments have been illustrated and described herein, it should be appreciated that any arrangement calculated to achieve the same purpose may be substituted for the specific embodiments shown. This disclosure is intended to cover any and all adaptations or variations of various embodiments. It is to be understood that the above description has been made in an illustrative fashion, and not a restrictive one. Combinations of the above embodiments, and other embodiments not specifically described herein will be apparent to those of skill in the art upon reviewing the above description. Thus, the scope of various embodiments includes any other applications in which the above compositions, structures, and methods are used.

It is emphasized that the Abstract of the Disclosure is provided to comply with 37 C.F.R. § 1.72(b), requiring an abstract that will allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separate preferred embodiment. In the appended claims, the terms "including" and "in which" are used as the plain-English equivalents of the respective terms "comprising" and "wherein," respectively. Moreover, the terms "first," "second," and "third," etc. are used merely as labels, and are not intended to impose numerical requirements on their objects.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. An apparatus, comprising:
processor circuitry coupled to at least one memory, the processor circuitry to:
determine a first storage format of a database operation on a database having a second storage format, and
perform a format conversion process responsive to the first storage format being different than the second storage format, the format conversion process to:
translate a virtual address of the database operation to a physical address, and
determine a converted physical address from the physical address using acceleration logic, stride logic or advanced conversion logic, the converted physical address comprising a memory address according to the first storage format.

2. The apparatus of claim 1, the first storage format comprising one of a column-oriented storage format or a row-oriented storage format.

3. The apparatus of claim 1, the second storage format comprising one of a column-oriented storage format or a row-oriented storage format, the second storage format being different than the first storage format.

4. The apparatus of claim 1, the processor circuitry to determine one of a plurality of virtual address spaces addressed by the virtual address.

5. The apparatus of claim 1, the processor circuitry to determine one of a plurality of virtual address spaces addressed by the virtual address, each of the plurality of virtual address spaces for a different storage format.

6. The apparatus of claim 1, the processor circuitry to determine the first storage format of the database operation based on a type of a virtual address space addressed by the virtual address.

7. The apparatus of claim 1, the virtual address addressed to one of a plurality of virtual address spaces for a physical memory storing the database, the one of the plurality of virtual address spaces having the first storage format.

8. The apparatus of claim 1, the processor circuitry to perform the format conversion process to translate the virtual address to a physical address using a translation look buffer (TLB) translation or a page table translation.

9. A computer-implemented method, comprising:
determining a first storage format of a database operation on a database having a second storage format; and
performing a format conversion process responsive to the first storage format being different than the second storage format, the format conversion process comprising:
translating a virtual address of the database operation to a physical address, and
determining a converted physical address from the physical address using acceleration logic, stride logic or advanced conversion logic, the converted physical address comprising a memory address according to the first storage format.

10. The method of claim 9, the first storage format comprising one of a column-oriented storage format or a row-oriented storage format.

11. The method of claim 9, the second storage format comprising one of a column-oriented storage format or a row-oriented storage format, the second storage format being different than the first storage format.

12. The method of claim 9, comprising determining one of a plurality of virtual address spaces addressed by the virtual address.

13. The method of claim 9, comprising determining one of a plurality of virtual address spaces addressed by the virtual address, each of the plurality of virtual address spaces for a different storage format.

14. The method of claim 9, comprising determining the first storage format of the database operation based on a type of a virtual address space addressed by the virtual address.

15. The method of claim 9, the virtual address addressed to one of a plurality of virtual address spaces for a physical memory storing the database, the one of the plurality of virtual address spaces having the first storage format.

16. The method of claim 9, comprising performing the format conversion process to translate the virtual address to a physical address using a translation look buffer (TLB) translation or a page table translation.

17. A non-transitory computer-readable storage medium, comprising a plurality of instructions that, when executed, enable processing circuitry to:
determine a first storage format of a database operation on a database having a second storage format; and
perform a format conversion process responsive to the first storage format being different than the second storage format, the format conversion process to:
translate a virtual address of the database operation to a physical address, and
determine a converted physical address from the physical address using acceleration logic, stride logic or advanced conversion logic, the converted physical address comprising a memory address according to the first storage format.

18. The computer-readable storage medium of claim 17, the first storage format comprising one of a column-oriented storage format or a row-oriented storage format.

19. The computer-readable storage medium of claim 17, the second storage format comprising one of a column-oriented storage format or a row-oriented storage format, the second storage format being different than the first storage format.

20. The computer-readable storage medium of claim 17, the plurality of instructions, when executed, to enable the processing circuitry to determine one of a plurality of virtual address spaces addressed by the virtual address.

21. The computer-readable storage medium of claim 17, the plurality of instructions, when executed, to enable the processing circuitry to determine one of a plurality of virtual address spaces addressed by the virtual address, each of the plurality of virtual address spaces for a different storage format.

\* \* \* \* \*